US008424810B1

(12) United States Patent
Shmilovich et al.

(10) Patent No.: US 8,424,810 B1
(45) Date of Patent: Apr. 23, 2013

(54) LOW NOISE WING SLAT SYSTEM WITH RIGID COVE-FILLED SLAT

(75) Inventors: Arvin Shmilovich, Huntington Beach, CA (US); Yoram Yadlin, Irvine, CA (US)

(73) Assignee: The Boeing Company, Chicago, IL (US)

( * ) Notice: Subject to any disclaimer, the term of this patent is extended or adjusted under 35 U.S.C. 154(b) by 265 days.

(21) Appl. No.: 12/751,468

(22) Filed: Mar. 31, 2010

(51) Int. Cl.
*B64C 3/50* (2006.01)

(52) U.S. Cl.
USPC ............................................... 244/214

(58) Field of Classification Search .................. 244/201, 244/211, 214–217
See application file for complete search history.

(56) References Cited

U.S. PATENT DOCUMENTS

| | | | |
|---|---|---|---|
| 4,285,482 A | 8/1981 | Lewis | |
| 4,399,970 A | 8/1983 | Evans | |
| 4,702,441 A * | 10/1987 | Wang | 244/204 |
| 4,752,049 A | 6/1988 | Cole | |
| 6,328,265 B1 * | 12/2001 | Dizdarevic | 244/213 |
| 6,394,396 B2 * | 5/2002 | Gleine et al. | 244/198 |
| 6,454,219 B1 * | 9/2002 | Moe | 244/214 |
| 6,457,680 B1 * | 10/2002 | Dobrzynski et al. | 244/210 |
| 6,536,714 B2 | 3/2003 | Gleine et al. | |
| 6,789,769 B2 * | 9/2004 | Mau et al. | 244/214 |
| 7,270,305 B2 | 9/2007 | Rampton et al. | |
| 2002/0195527 A1 | 12/2002 | Broadbent | |
| 2008/0179464 A1 | 7/2008 | Bender et al. | |
| 2011/0240803 A1 | 10/2011 | Shmilovich et al. | |

FOREIGN PATENT DOCUMENTS

| | | |
|---|---|---|
| DE | 10 2004 056567 A1 | 6/2006 |
| EP | 1 147 985 A2 | 10/2001 |
| FR | 1 011 175 A | 6/1952 |

OTHER PUBLICATIONS

Andreou et al., Aeroacoustic Comparison of Airfoil Leading Edge High-Lift Geometries and Supports, Jan. 2007, AIAA, pp. 1-20.*
International Search Report and Written Opinion dated Jul. 19, 2011 in PCT/US2011/026479.
Andreou, et al., Abstract entitled, "Aeroacoustic Comparison of Airfoil Leading Edge High-Life Geometries and Supports," presented at the 45th American Institute of Aeronautics and Astronautics (AAIA) Aerospace Sciences Meeting and Exhibit, Jan. 8-11, 2007, Reno, Nevada;AIAA 2007-230; 20 Pages.
Kolb, et al., Abstract entitled, "Aeroacoustic Wind Tunnel Measurements on a 2D High-Lift Configuration," presented at the 13th AIAA/CEAS Aeroacoustics Conference, 28th American Institute of Aeronautics and Astronautics (AAIA) Aeroacoustics Conference, May 21-23, 2007, Reno, Nevada; AIAA 2007-3447; 19 Pages.

(Continued)

*Primary Examiner* — Tien Dinh
*Assistant Examiner* — Keith L Dixon
(74) *Attorney, Agent, or Firm* — Hope Baldauff Hartman, LLC

(57) ABSTRACT

Concepts and technologies described herein provide for a low noise aircraft wing slat system. According to one aspect of the disclosure provided herein, a cove-filled wing slat is used in conjunction with a moveable panel rotatably attached to the wing slat to provide a high lift system. The moveable panel rotates upward against the rear surface of the slat during deployment of the slat, and rotates downward to bridge a gap width between the stowed slat and the lower wing surface, completing the continuous outer mold line shape of the wing, when the cove-filled slat is retracted to the stowed position.

17 Claims, 6 Drawing Sheets

OTHER PUBLICATIONS

Imamura, et al., Abstract entitled, "Designing of Slat Cove Filler as a Noise Reduction Device for Leading-Edge Slat," presented at the 13th AIAA/CEAS Aeroacoustics Conference, 28th American Institute of Aeronautics and Astronautics (AAIA) Aeroacoustics Conference, May 21-23, 2007, Reno, Nevada; AIAA 2007-3473; 17 Pages.

Imamura, et al., Abstract entitled, "Numerical and Experimental Research of Low-Noise Slat Using Simplified High-Lift Model," presented at the 14th AIAA/CEAS Aeroacoustics Conference, 29th American Institute of Aeronautics and Astronautics (AAIA) Aeroacoustics Conference, May 5-7, 2008, Vancouver, British Columbia Canada; AIAA 2008-2918; 18 Pages.

U.S. Official Action dated May 30, 2012 in U.S. Appl. No. 12/751,514.

U.S. Notice of Allowance dated Jun. 26, 2012 in U.S. Appl. No. 12/751,419.

U.S. Official Action dated Feb. 16, 2012 in U.S. Appl. No. 12/751,419.

\* cited by examiner

LOW NOISE WING SLAT SYSTEM WITH RIGID COVE-FILLED SLAT

GOVERNMENT RIGHTS

This invention described herein was made in performance of work under NASA Contract No. NNL04AA11B—Task Order# NNL08AD73T and is subject to the provisions of Section 305 of the National Aeronautics and Space Act of 1958 (72 Stat. 435: 42 U.S.C 2457).

BACKGROUND

Reducing noise levels associated with airport environments has become a progressively higher priority within the aircraft industry. However, increasingly stringent noise regulations have resulted in an increase in air traffic inefficiencies and a reduction in airport productivity. For example, at many airports, current capacity is largely controlled by the hours of operations, which are typically confined to mostly daylight hours in order to prevent or mitigate noise pollution. During aircraft takeoff, approach, and landing operations, noise is generated in large part by the aircraft engines and airframe components. With the advent of high bypass ratio engines, a significant reduction in engine noise has been achieved, with continued advancements being made.

A significant source of airframe noise originates with the aircraft high lift system. In particular, slotted leading edge slats produce high noise levels because of the flow recirculation that occurs in a cove region located on a rear side of a deployed leading edge wing slat. Conventional wing slats are configured to mate with the leading edge of the aircraft wings so that each slat and wing together create a desired airfoil shape when the slat is retracted against the leading edge of the wing. In doing so, conventional slats may have a leading edge that is substantially shaped like the leading edge of the wing, but have a rear side that is generally concave in shape as it is shaped to mate with the generally convex leading edge of the wing. When the slat is extended forward and rotated downward for high lift operations, the concave shape of the rear side of the slat creates a cove in which the ambient airstream flowing around the slat recirculates, creating noise.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Concepts and technologies described herein provide for a rigid cove-filled slat configured to minimize the air recirculation around the slat and decrease associated noise levels. According to one aspect of the disclosure provided herein, a low noise wing leading edge wing slat includes a front surface and a rigid rear surface. The rigid rear surface converges with the front surface at an upper vertex and at a lower vertex. The upper vertex abuts an upper surface of an aircraft wing, while the lower vertex is near a lower surface of the aircraft wing when the slat is in a stowed position with the rear surface hidden from an ambient airflow. At least a portion of the rigid rear surface between the upper vertex and lower vertex is not concave.

According to another aspect, a high lift system includes an aircraft wing and a rigid cove-filled slat having a rotatable panel. The panel is configured to rotate down when the slat is in a stowed position. When the panel is in the stowed position, an upper surface of the aircraft wing, a front surface of the slat, the rotatable panel, and a lower surface of the aircraft wing create a continuous outer mold line shape.

According to yet another aspect of the disclosure, a method for reducing aircraft noise associated with a high lift system includes deploying a rigid cove-filled slat from a leading edge of an aircraft wing to a high lift position. Upon deployment of the slat, a rotatable panel that is connected to the slat is retracted from a deployed position to a stowed position against a rear surface of the slat.

The features, functions, and advantages that have been discussed can be achieved independently in various embodiments of the present disclosure or may be combined in yet other embodiments, further details of which can be seen with reference to the following description and drawings.

DETAILED DESCRIPTION

Figure 1:
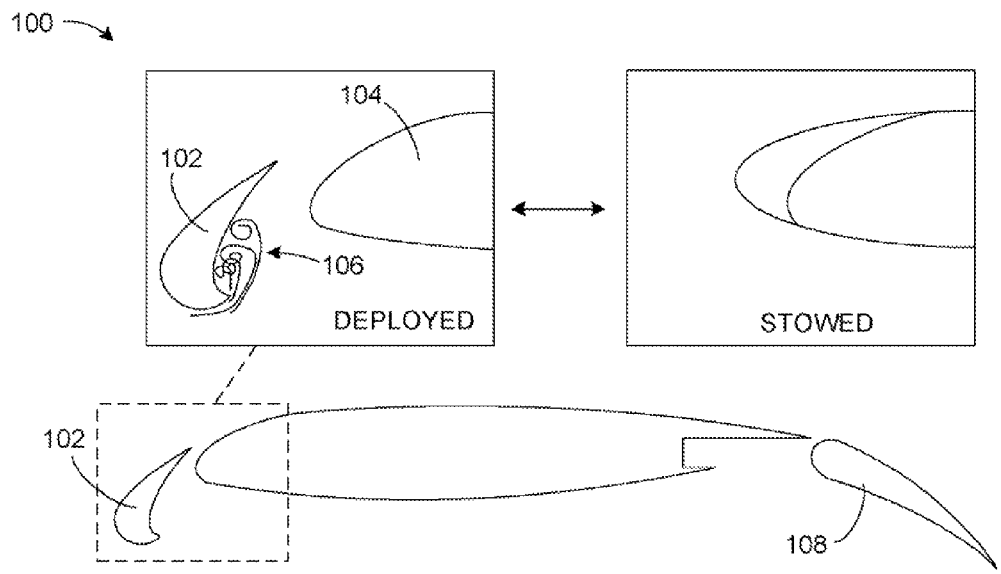
FIG. 1 is a cross-sectional view of a conventional high lift system showing a conventional leading edge slat in deployed and stowed configurations with corresponding noise-inducing airflow recirculation within the slat cove.

The following detailed description is directed to systems and methods for providing a high lift system that utilizes cove-filled leading edge wing slats to eliminate or reduce the noise-creating air recirculation associated with conventional leading edge wing slats. In the following detailed description, references are made to the accompanying drawings that form a part hereof, and which are shown by way of illustration, specific embodiments, or examples. Like numerals represent like elements through the several figures. Referring now to FIG. 1, a conventional high lift system 100 will be described.

The conventional high lift system 100 may include a conventional leading edge slat 102 and flap 108 that work together to alter the shape of an aircraft wing 104 to create additional aerodynamic lift. The conventional leading edge slat 102 is configured to mate with the leading edge of an aircraft wing 104 so that the conventional slat 102 and wing 104 together create a desired airfoil shape, as shown with the conventional slat 102 positioned in the stowed configuration. Because the conventional slat 102 and wing 102 must create a desired airfoil shape when the conventional slat 102 is retracted against the leading edge of the aircraft wing 104 in the stowed configuration, and because the aircraft wing 104 must retain an airfoil shape when the conventional slat 102 is extended to the deployed configuration, traditionally, the rear side of a conventional slat 102 has a concave shape that substantially corresponds to the convex shape of the leading edge of the aircraft wing 102 to allow the two surfaces to mate when the conventional slat 102 is stowed.

However, as discussed above, and as shown in FIG. 1, the concave shape of the rear side of the conventional slat 102 creates a cove region that results in a recirculation 106 of the ambient airflow as it flows around the conventional slat 102. It is this recirculation 106 of the ambient airflow that is the source of a substantial amount of noise during takeoff and landing operations. In addition to the noise created by the cove region of the conventional slat 102, the air recirculation 106 within the cove region is not aerodynamically optimal, reducing the amount of lift, increasing the amount of drag, thereby reducing the corresponding aircraft performance benefits that could result should this recirculation 106 be eliminated.

Figure 2:
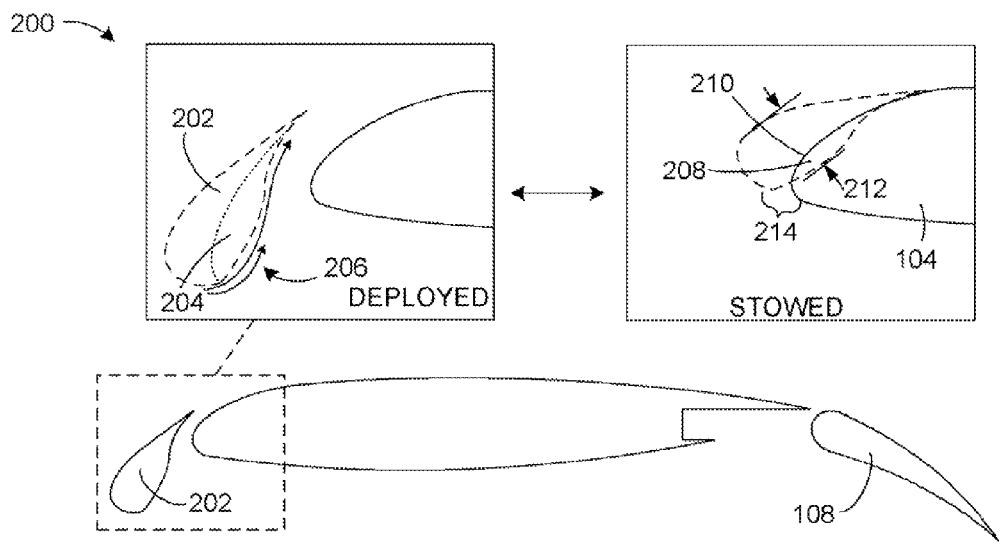
FIG. 2 is a cross-sectional view of a high lift system showing a cove-filled leading edge slat in deployed and stowed configurations according to various embodiments presented herein.

FIG. 2 illustrates a high lift system 200 that takes advantage of a cove-filled leading edge slat 202 to decrease or eliminate the air recirculation 106 and corresponding noise and performance degradation that results from the recirculation 106. As seen in FIG. 2, the leading edge wing slat is a cove-filled slat 202 in which the cove region 204 has been filled to eliminate the convex portion of the rear side of the slat that is common to a conventional slat 102. The filled cove region 204 provides a smooth, gradual turn for the ambient airflow, creating a substantially continuous flow 206 that substantially reduces the noise associated with the recirculation 106 present with conventional slats.

It should be appreciated that the substantially continuous flow 206 may include laminar flow, turbulent flow, or a combination thereof according to the precise design characteristics of the high lift system 200 and the corresponding flight characteristics at any given instance. However, the cove-filled leading edge slat 202 substantially reduces or eliminates the considerable recirculation 106 that is present within the cove of the conventional slat 102, which substantially reduces the airframe noise associated with this recirculation 106. As will be described in further detail below, the cove-filled slat 202 may be shaped and sized according to the specific application and corresponding desirable aerodynamic properties. According to the various embodiments described herein, the cove-filled slat 202 is rigid so that the rear side of the cove-filled slat 202 is not flexible or inflatable in that it retains the same cross-sectional shape when deployed as when stowed, with the exception of a moveable panel that deploys and retracts from the rear surface of the slat as described below.

As seen in FIG. 2, the stowed configuration of the cove-filled slat 202 creates an overlap area 208 in which the cove region 204 overlaps or interferes with the leading edge 210 of a conventional aircraft wing 104. Depending on the shape and configuration of the cove-filled slat 202, there may additionally be a gap width 214 created between the slat and a lower surface of the aircraft wing 104. The overlap area 208 and gap width 214 may be resolved utilizing various techniques.

One technique for resolving the overlap area 208 and gap width 214 is to fill the cove region 204 of the cove-filled slat 202 in a manner that extends the rear surface of the slat rearward from the lower vertex of the conventional slat 102 (where the lower surface turns upward and inward to the cove region 204) so that the lower surface of the slat fills the gap width 214 when stowed. The leading edge 210 of the aircraft wing 104 may then be configured to retract within the wing to accommodate the overlap area 208. This technique is described in co-pending U.S. patent application Ser. No. 12/751,419, now U.S. Pat. 8,276,852, entitled "Low Noise Wing Slat System With Deployable Wing Leading Edge Elements" and filed concurrently with the present application on Mar. 31, 2010, which is herein incorporated by reference in its entirety.

Another technique for resolving the overlap area 208 and gap width 214 is to maintain a fixed leading edge 210 of the aircraft wing 104, however positioning the leading edge 210 rearward toward a main wing spar so as to accommodate the rear surface of the cove-filled slat 202 and eliminate the overlap area 208. The gap width 214 is then bridged using a deployable bridging panel attached to the lower surface of the aircraft wing when the cove-filled slat 202 is stowed. This technique is described in co-pending U.S. patent application Ser. No. 12/751,514, entitled "Low Noise Wing Slat System With a Fixed Wing Leading Edge and Deployable Bridging Panels" and filed concurrently with the present application on Mar. 31, 2010, which is herein incorporated by reference in its entirety.

As will be described in greater detail below with respect to FIGS. 4A-7, utilizing the concepts and technologies disclosed herein, this overlap area 208 and the gap width 214 is accommodated in a manner that minimizes any encroachment into a main wing element by the cove-filled slat 202 and/or a moveable leading edge element. Because the space within a wing, and specifically within a forward wing cavity defined between the main wing spar and the leading edge of the wing, is often limited by structural elements, actuators, and other aircraft systems, it is desirable to limit any reduction in this space, including permanent space reductions as with fixed leading edge solutions, and temporary space reductions as with deployable leading edge solutions.

Consequently, according to the various embodiments described herein, the cove region 204 of the conventional slat 102 is minimally filled to eliminate the concave portion of the conventional slat 102 in a manner that minimizes the overlap area 208. In other words, a depth 212 of the cove-filled slat 202 between a front surface and a rear surface of the slat is minimized, while minimizing the cove region 204. The resulting shape of the cove-filled slat 202 minimizes or eliminates the air recirculation 106 and creates the substantially continuous flow 206. The minimal depth 212 of the cove-filled slat 202 minimizes the distance that a moveable leading edge element translates into the wing cavity during retraction to a stowed configuration, or maximizes the size of the wing cavity in an aircraft wing 104 having a fixed leading edge 210. As will be described below, a moveable panel deploys from the cove-filled slat 202 to bridge the gap width 214 when the slat is configured in the stowed position.

Figure 3:
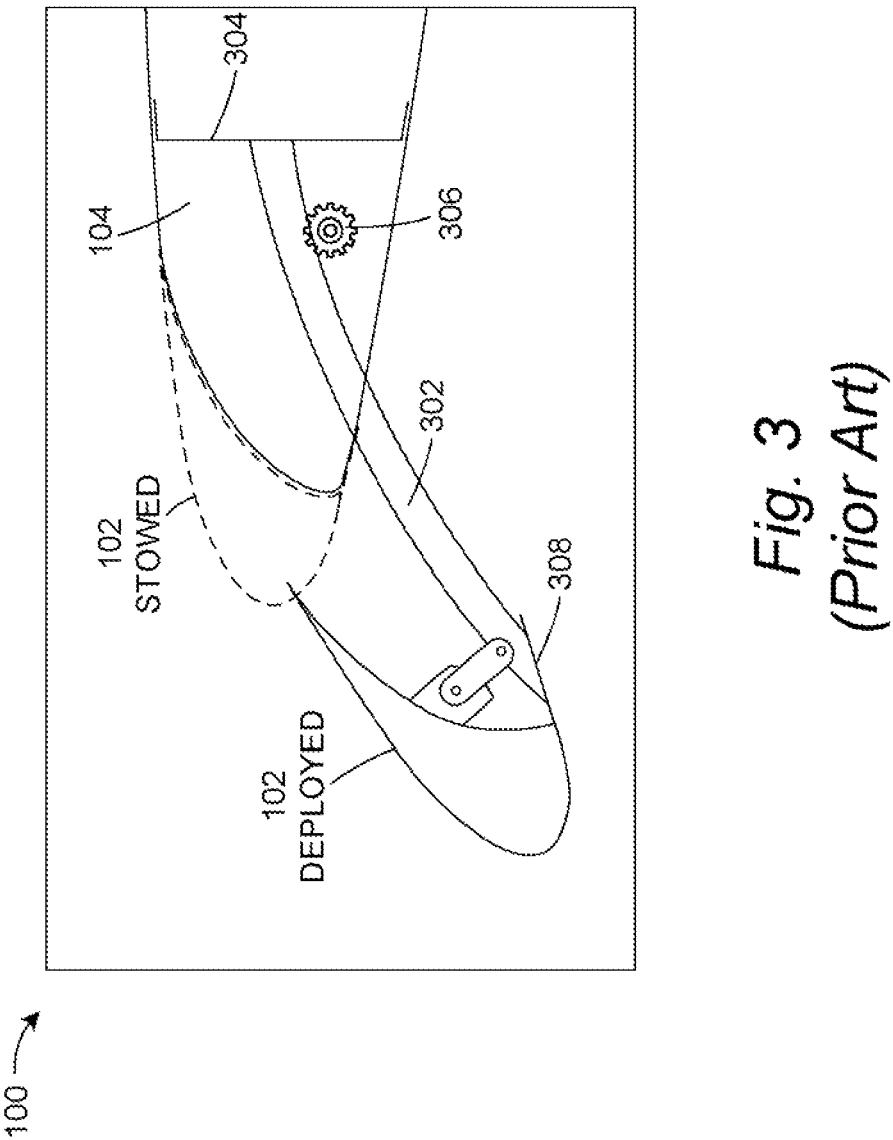
FIG. 3 is a cross-sectional view of a conventional high lift system showing a conventional leading edge slat in a deployed configuration.

Prior to discussing the various embodiments associated with the cove-filled slat 202 and corresponding high lift system 200, the conventional high lift system 100 will be discussed in greater detail with respect to FIG. 3 for comparison purposes. Looking at FIG. 3, the conventional slat 102 is shown in solid lines in the deployed position. The conventional slat 102 is depicted in broken lines in the stowed position. As seen in the stowed position, a rear side of the conventional slat 102 is generally concave to compliment the generally convex leading edge of the aircraft wing 104. A guide rail 302 connects the conventional slat 102 to the wing spar 304 or other structural component of the aircraft wing 104. A rotary actuator and pinion gear 306 operate to extend and retract the conventional slat 102 on the guide rail 302 between the deployed and stowed positions.

It can be seen that the guide rail 302 may be connected to the conventional slat 102 via a bottom plate 308. This bottom plate 308 not only provides a connection point for the guide rail 302, but also provides an aerodynamic transition between the bottom side of the conventional slat 102 and a lower surface of the aircraft wing 104, guiding the ambient airflow around the conventional slat 102 and the lower surface of the aircraft wing 104 when the slat is configured in the stowed position. However, when the conventional slat 102 is configured in the deployed position, the bottom plate 308, coupled with the concave shape of the rear surface of the slat, creates the cove in which the noise producing air recirculation 106 occurs as the ambient airflow streams around the bottom of the slat.

Figure 4A:
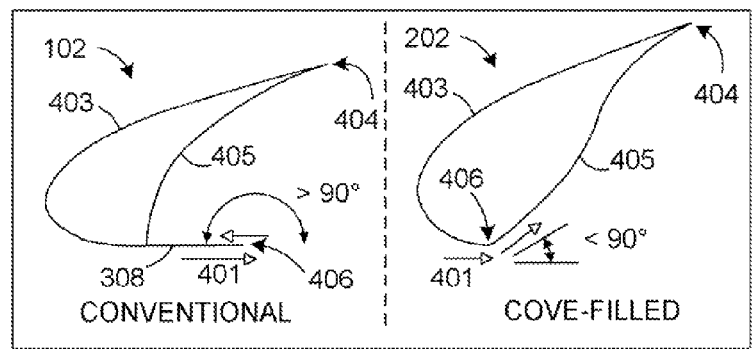
FIG. 4A is a cross-sectional view of a conventional slat and a cove-filled slat comparing aspects of each according to various embodiments presented herein.

Turning now to FIG. 4A, a cove-filled slat 202 according to the embodiments described herein will be compared to a conventional slat 102. As shown, a conventional slat 102 includes an upper vertex 404, which corresponds to the upper location where a front surface 403 of the slat converges with a rear surface 405 of the slat. Additionally, the conventional slat 102 includes a lower vertex 406, which corresponds to the lower location where the front surface 403 converges with the rear surface 405. As described above, a conventional slat 102 may include a bottom plate 308 that provides the connection point for the guide rail 302 and provides an aerodynamic transition between the conventional slat 102 and a lower surface of the aircraft wing 104.

The front surface 403 of the slat transitions to the rear surface 405 around this bottom plate 308. As a result, in order for an ambient airflow 401 to smoothly transition from the front surface 403 to the rear surface 405, the airflow 401 must turn through an ambient airflow turning angle of greater than 90 degrees. In fact, the ambient airflow turning angle shown for the conventional slat 102 is approximately 180 degrees. Because the ambient airflow 401 will not smoothly transition through such a severe turning angle, the recirculation 106 is created.

In contrast, as seen with respect to the cove-filled slat 202 of the present disclosure, the ambient airflow turning angle around the lower vertex 406 of the cove-filled slat 202 may be less than 90 degrees, creating a smoother transition for the ambient airflow 401 around the lower vertex 406. The characteristics of the ambient airflow 401 as it flows around the lower vertex 406 may be dependent on a number of variables, including but not limited to, the airfoil shape corresponding to the cove-filled slat 202, the angle of attack of the airplane, the slat deflection angle, and the velocity of the ambient airflow 401. Consequently, the disclosure provided herein is not limited to a specific ambient airflow turning angle or a specific airfoil shape and contour with respect to the cove-filled slat 202. Rather, the concepts described herein provide for a minimally filled cove region 204 that eliminates the concave portion of the rear surface 405 of a conventional slat 102 proximate to the lower vertex 406. As shown, the cove-filled slat 202 has a rear surface 405 of which at least the portion between the lower vertex 406 and approximately a midpoint of the rear surface 405, the contour of the surface is not concave, and may be convex.

Figure 4B:
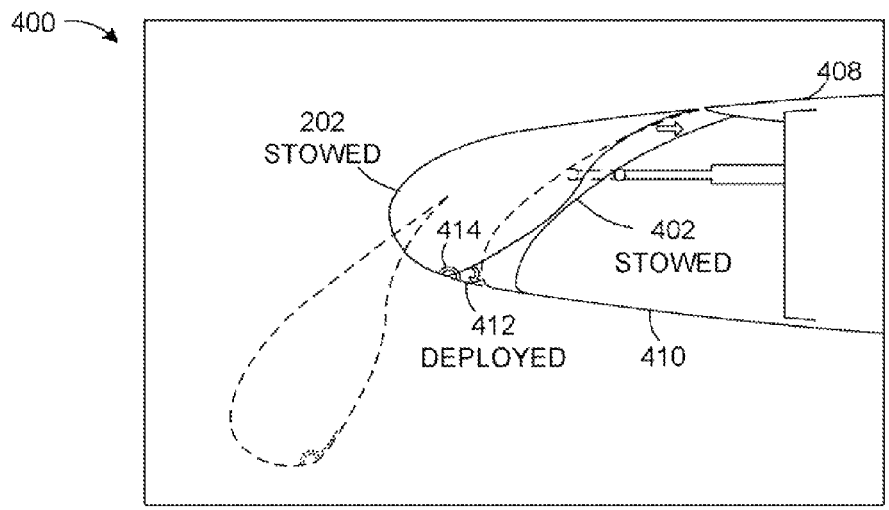
FIGS. 4B and 4C are cross-sectional views of a high lift system showing a cove-filled slat in stowed and deployed configurations with a moveable leading edge element of an aircraft wing according to various embodiments presented herein.

Looking now at FIGS. 4B and 4C, a first embodiment of a low noise high lift system will be discussed. According to this embodiment, a high lift system 400 includes a cove-filled slat 202, a main wing element, and a leading edge element 402. The main wing element includes an upper wing surface 408 and a lower wing surface 410, as well as the structural and other components within the aircraft wing 104. According to this embodiment, the leading edge element 402 is moveable between a stowed position and a deployed position. FIG. 4B shows the cove-filled slat 202 and leading edge element 402 in the stowed positions, while FIG. 4C shows the cove-filled slat 202 and the leading edge element 402 in deployed positions.

As mentioned above, U.S. Pat. 8,276,852 describes a cove-filled slat in use with a deployable wing leading edge element. One difference with respect to the high lift system 400 described herein and shown in FIGS. 4B and 4C, is that due to the minimally filled cove region 204 of the cove-filled slat 202, the distance of travel of the leading edge element 402 is minimal as compared to a cove-filled slat as described in the co-pending application that is shaped to optimize the substantially continuous flow 206 around the deployed slat, while abutting the main wing element when stowed so as to form a continuous outer mold line shape with the wing. It should be appreciated that while a one-piece moveable leading edge element is shown, the embodiments disclosed herein are equally applicable to a two-piece moveable leading edge element or any leading edge element that is configured to deploy and retract in any manner, as well as fixed leading edge elements as will be described in further detail below.

Figure 4C:
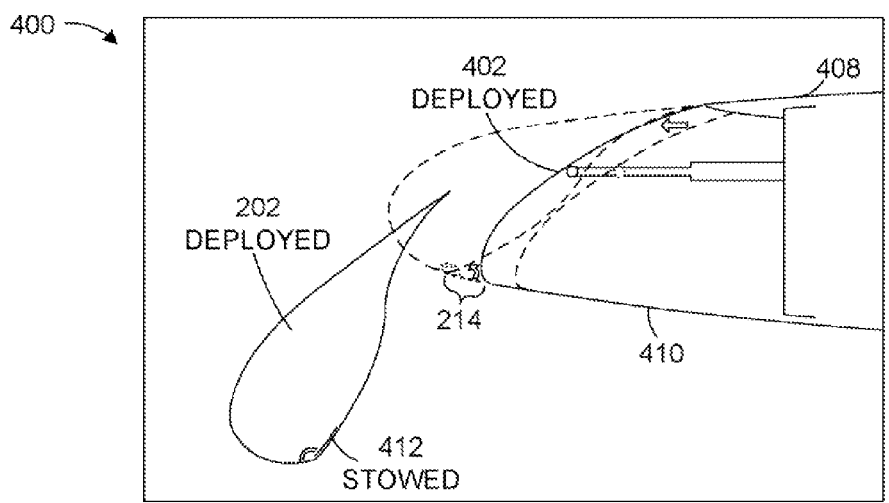

While minimally filling the cove region 204 of the cove-filled slat 202 shown in FIGS. 4A-4C minimizes the amount of travel of the leading edge element 402, this configuration of the cove-filled slat 202 also creates the gap width 214 between the lower vertex 406 of the cove-filled slat 202 and the lower wing surface 410 when configured in the stowed position. According to one embodiment, this gap width 214 is bridged with a moveable panel 412, as shown in FIG. 4A. The moveable panel 412 may be rotatably connected to the cove-filled slat 202 at a location proximate to the lower vertex 406 via an actuator 414. When the cove-filled slat 202 is retracted to the stowed position, the moveable panel rotates downward from the rear surface 405 of the cove-filled slat 202 to a deployed position in which it abuts the lower wing surface 410 to bridge the gap width 214. Similarly, as shown in FIG. 4B, when the cove-filled slat 202 is deployed, the moveable panel 412 rotates upward to the stowed position against or within the rear surface 405 of the cove-filled slat 202. It should be appreciated that the moveable panel 412 may be made from the same structural and aircraft skin materials as the main wing element and/or the cove-filled slat 202.

Figure 5A:
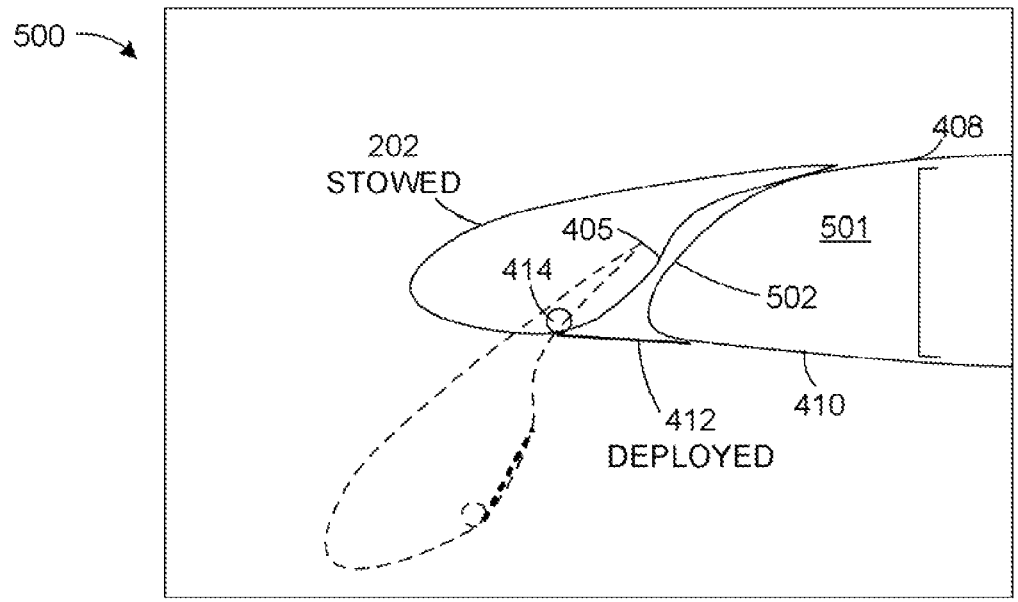
FIGS. 5A and 5B are cross-sectional views of a high lift system showing a cove-filled slat in stowed and deployed configurations with a fixed wing leading edge according to various embodiments presented herein.
Figure 5B:
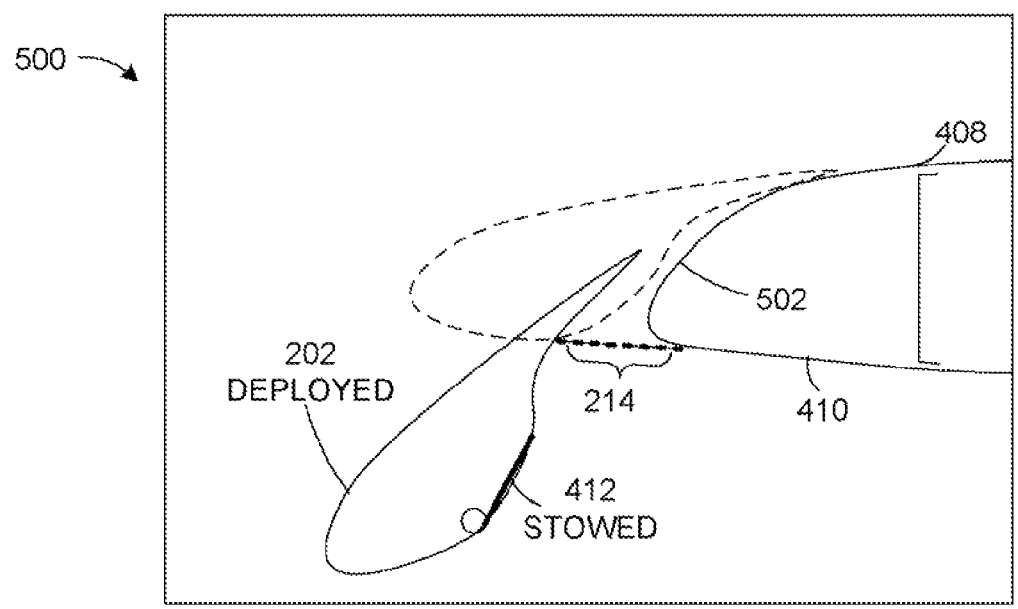

Turning now to FIGS. 5A and 5B, a second embodiment of a low noise high lift system will be discussed. According to this embodiment, a high lift system 500 includes the cove-filled slat 202, and an aircraft wing having a fixed leading edge 502. Rather than utilizing a moveable leading edge element 402 as described above, the high lift system 500 includes a wing having a fixed leading edge 502 and a corresponding forward cavity 501 that may be reduced in size to accommodate the rear surface 405 of the cove-filled slat 202.

As mentioned above, co-pending U.S. patent application Ser. No. 12/751,514, entitled "Low Noise Wing Slat System With a Fixed Wing Leading Edge and Deployable Bridging Panels" and filed concurrently with the present application on Mar. 31, 2010, describes a cove-filled slat in use with a fixed wing leading edge. While the co-pending application discloses a moveable lower bridging element that is stowed within the aircraft wing and is deployed to bridge a gap width between the cove-filled slat and lower wing surface, the embodiments shown in FIGS. 5A and 5B utilize a moveable panel 412 that is stowed on the cove-filled slat 202 and rotates downward from the rear surface 405 of the slat to the deployed position and upwards to the rear surface 405 of the slat to the stowed position. Doing so takes the actuator 414 out of the space-limited forward cavity 501 of the wing and places it within the slat. It should be appreciated that either embodiments may be beneficial depending upon the particular application according to the available space within the cove-filled slat 202 and forward cavity 501, as well as any number of other design considerations, including but not limited to, weight, cost, whether the high lift system is associated with a new aircraft or is being retrofitted onto an existing aircraft, maintenance ease and costs, and others.

It should be clear from the illustrative view of the high lift systems 400 and 500 shown in FIGS. 4A-5B that at full deployment of the high lift system (400, 500), the cove-filled slat 202 is extended and rotated downward into a high lift configuration, while the moveable panel 412 is rotated upward to the stowed position against or within the rear surface 405 of the slat. When retracted from the high lift configuration to a stowed configuration, the cove-filled slat 202 is retracted to the leading edge of the aircraft wing 104, while the moveable panel 412 is rotated downward until a distal edge of the moveable panel 412 abuts the lower wing surface 410.

When the cove-filled slat 202 is stowed and the moveable panel 412 is deployed, the upper surface 408 of the aircraft wing 104, the front surface 403 of the cove-filled slat 202, the moveable panel 412, and the lower surface 410 of the aircraft wing 104 define a continuous outer mold line shape of the aircraft wing. This outer mold line shape may be similar or identical to the outer mold line shape of a conventional high lift system 100, however allowing for the use of a cove-filled slat 202. The combination of the smooth, continuous outer mold line shape of the deployed high lift system (400, 500), coupled with the smooth transition from the front surface 403 of the cove-filled slat 202 to the rear surface 405 of the cove-filled slat, allows for smooth airflow through the high lift system (400, 500) and a corresponding reduction in noise.

Figure 6:
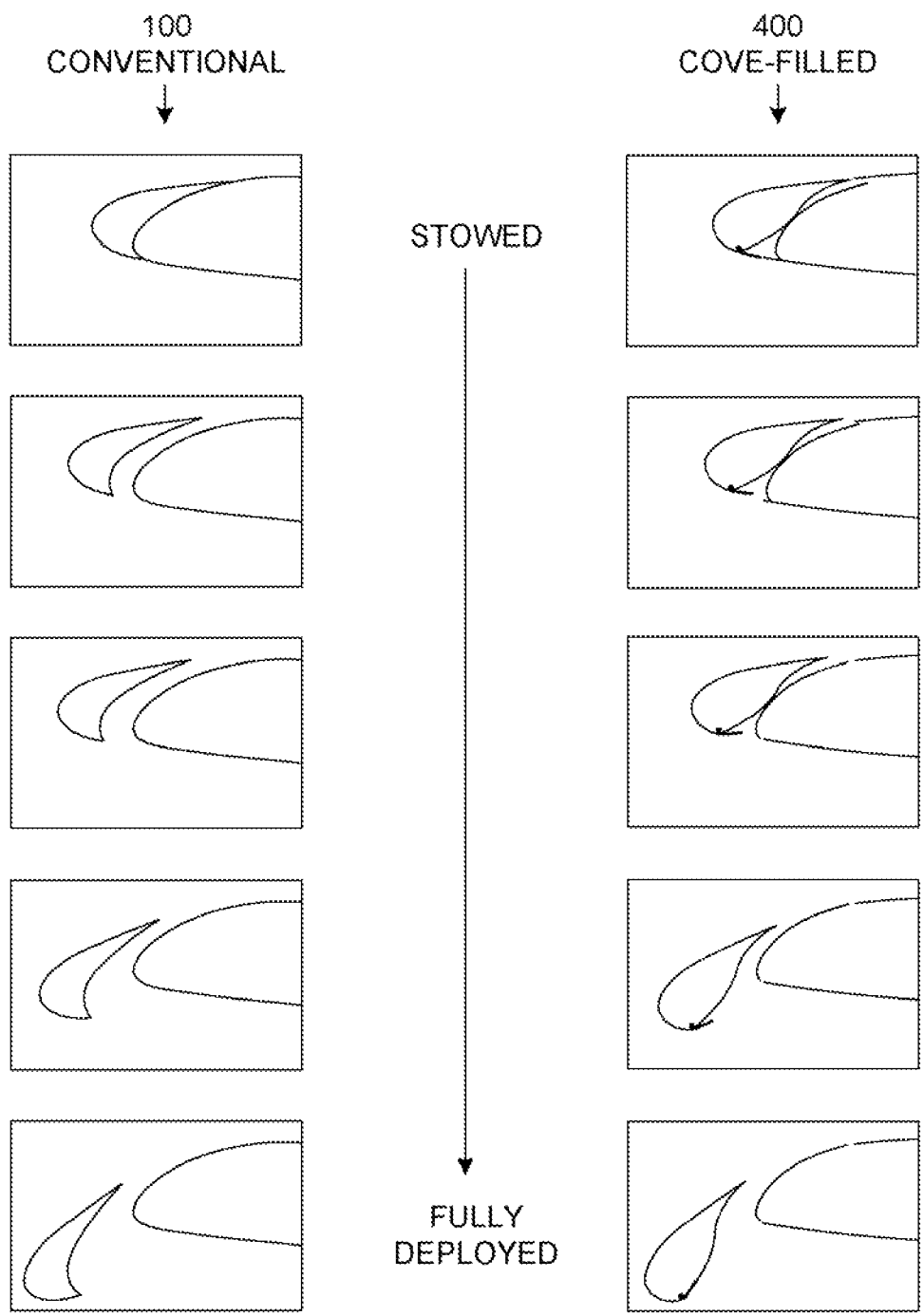
FIG. 6 is a graphical depiction of a conventional high lift system and a high lift system utilizing a cove-filled slat during deployment operations according to various embodiments presented herein.

Turning to FIG. 6, an illustrative series of diagrams depicting progressive stages of deployment of a conventional high lift system 100 and a high lift system 400 will be described. For clarity, the deployment stages of the high lift system 500 are not shown. It should be appreciated that the configuration of the aircraft wing 104, whether the embodiment utilizes a moveable leading edge element 402 or a fixed leading edge 502, is not central to this disclosure. Moreover, for simplicity in light of the large number and relatively small size of the various diagrams, the diagrams of FIG. 6 are shown without identifying the various components with reference numbers, although reference numbers will be used in this description for clarity purposes.

As seen in FIG. 6, the two systems are shown side-by-side for comparison purposes. Starting at the top and moving downwards, the systems begin in stowed configurations and progress through the deployment process until the slats are fully deployed into high lift positions. It can be seen that the deployment of the conventional high lift system 100 includes the extension and downward rotation of the conventional slat 102. As previously discussed, because the conventional slat 102 is designed to abut and conform to the leading edge of the aircraft wing 104 when stowed, the rear surface of the slat is concave, which creates the cove that induces air recirculation 106 and creates undesirable noise.

The cove-filled slat 202 can be seen in the top right diagram in a stowed position against the aircraft wing 104 with the moveable panel 412 deployed. In this stowed configuration, the upper vertex 404 of the cove-filled slat 202 abuts an outer edge of the upper wing surface 408 and a distal end of the moveable panel 412 abuts the lower wing surface 410 so that the upper wing surface 408, the cove-filled slat 202, the moveable panel 412, and the lower wing surface 410 together create the continuous outer mold line shape of the airfoil. During deployment, the cove-filled slat 202 extends and rotates outward and downward, while the moveable panel 412 is rotated upward until flush with or against the rear surface 405 of the slat. In this deployed position, shown in the bottom right diagram, the cove-filled slat 202 provides a smooth, gradual turning radius around the lower rear side of the slat in order to eliminate the air recirculation 106 and decrease associated noise.

Figure 7:
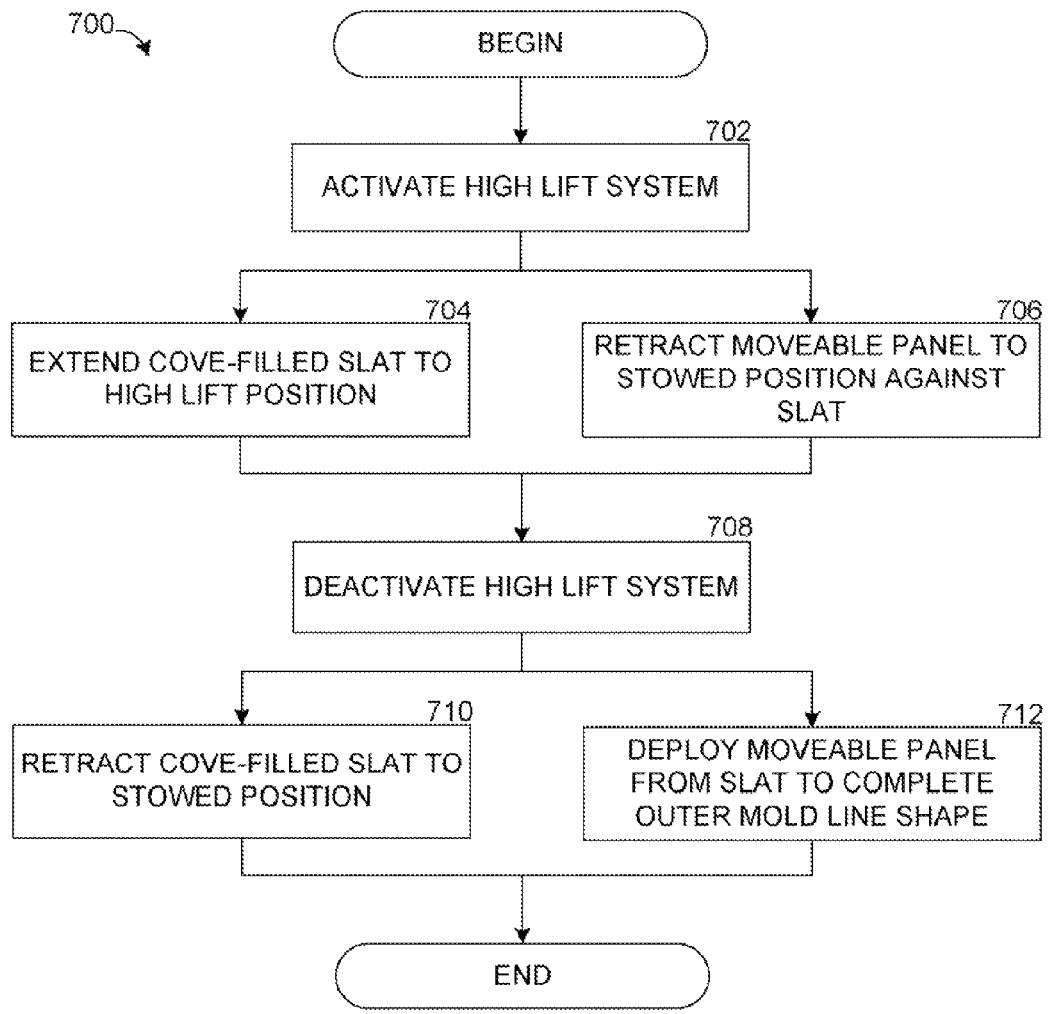
FIG. 7 is a flow diagram showing a method for reducing aircraft noise associated with a high lift system according to various embodiments presented herein.

Turning now to FIG. 7, an illustrative routine 700 for providing a reduced noise, high lift system for aircraft takeoff and landing operations will now be described in detail. It should be appreciated that more or fewer operations may be performed than shown in the figures and described herein. These operations may also be performed in a different order than those described herein.

The routine 700 begins at operation 702, where the high lift system (400, 500) is activated. The activation may be initiated via a cockpit switch or by a flight computer system upon detection and analysis of any quantity and type of flight criteria that indicates that the deployment of the cove-filled slats 202 is desirable and proper. Upon activation of the high lift system (400, 500), the routine 700 continues substantially simultaneously to operations 704 and 706. At operation 704, the cove-filled slat 202 is extended to the high lift position from the stowed position. At operation 706, the moveable panel is rotated upward to the rear surface 405 of the cove-filled slat 202 to the stowed position. Although not shown, it should be appreciated that the deployment of the cove-filled slats 202 may occur simultaneously with the deployment of the flaps 108, which increase the lift created by the aircraft wing 104.

When the high lift system (400, 500) is no longer needed, it is deactivated at operation 708. As with the activation, the deactivation may be via a manual selection of a switch or toggle, or may be automated by a flight computer according to current flight criteria. Upon deactivation of the high lift system (400, 500), the routine 700 continues substantially simultaneously to operations 710 and 712. At operation 710, the cove-filled slat 202 is retracted until the upper vertex 404 of the slat is adjacent to the outer edge of the upper wing surface 408. At operation 712, the moveable panel 412 is deployed outward until it aligns with and abuts the lower wing surface 410 to complete the continuous outer mold line shape of the aircraft wing 104. Although not shown, it should again be appreciated that the retraction of the cove-filled slat 202 may occur simultaneously with the retraction of the flaps 108. After the high lift system (400, 500) is stowed, the routine 700 ends.

It should be appreciated from the above disclosure that the concepts presented herein provide a solution to the negative affect that conventional slats 102 have on the creation of noise during takeoff and landing operations. In addition to reducing the noise associated with the recirculation 106 in the cove region of conventional slats 102, the use of cove-filled slats 202 and moveable panels 412 has a benefit of enhancing the takeoff performance of an aircraft.

By filling in the cove region of the conventional slats 102 and eliminating the air recirculation 106, the drag associated with the air recirculation 106 is significantly reduced. A reduction in drag allows for an increased aircraft payload, an increase in aircraft range, a decreased runway distance, and/or smaller engines since less thrust is required to overcome the airplane drag. A decrease in the engine size and/or thrust output has direct and favorable implication to aircraft weight, fuel consumption, and general eco-friendliness.

Based on the foregoing, it should be appreciated that technologies for providing a low noise, high lift system have been disclosed herein. It is to be understood that the invention defined in the appended claims is not necessarily limited to the specific features, configurations, acts, or media described herein. Rather, the specific features, configurations, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A low noise leading edge wing slat, comprising:
   a front surface;
   a rigid rear surface converging with the front surface at an upper vertex and at a lower vertex such that the upper vertex abuts an upper surface of an aircraft wing and the lower vertex is proximate to a lower surface of the aircraft wing when the low noise leading edge wing slat is configured in a stowed position against the aircraft wing such that the rigid rear surface between the upper vertex and the lower vertex is hidden from an ambient airflow over the aircraft wing in the stowed position, wherein at least a first portion of the rigid rear surface between the upper vertex and the lower vertex is substantially concave and a cove-filled second portion of the rigid rear surface is substantially convex and lower than the first portion; and
   a moveable panel, rotatably connected proximate to the lower vertex, configured to rotate downward from the rear surface when the low noise leading edge wing slat is refracted to the stowed position such that the moveable panel bridges a gap width between the lower vertex and the lower surface of the aircraft wing and a distal edge of the moveable panel abuts the lower surface of the aircraft wing, and the moveable panel is also configured to rotate upward toward the cove-filled second portion of the rear surface when the low noise leading edge wing slat is extended away from the aircraft wing.

2. The low noise leading edge wing slat of claim 1, wherein an ambient airflow turning angle corresponding to the lower vertex is less than approximately 90 degrees.

3. The low noise leading edge wing slat of claim 1, wherein the lower vertex is positioned a gap width apart from the lower surface of the aircraft wing when the low noise leading edge wing slat is configured in the stowed position.

4. The low noise leading edge wing slat of claim 1, further comprising an actuator attached to the moveable panel and configured to rotate the moveable panel around the lower vertex.

5. The low noise leading edge wing slat of claim 1, wherein at least a portion of the rigid rear surface between the lower vertex and a midpoint of the rigid rear surface is convex.

6. A high lift system, comprising:
   an aircraft wing having an upper surface, a lower surface, and a fixed leading edge; and
   a rigid cove-filled slat having a rear surface, wherein a first portion of the rear surface between an upper vertex and a lower vertex is substantially concave and a second portion of the rear surface is cove-filled, lower than the first portion, and substantially convex, the slat being configured to retract to a position adjacent to the fixed leading edge of the aircraft wing when configured in a stowed position and to extend away from the fixed leading edge of the aircraft wing when configured in a deployed position, and
   a rotatable panel adapted to rotate down when the rigid cove-filled slat is configured in the stowed position such that the upper surface of the aircraft wing, a front surface of the rigid cove-filled slat, the rotatable panel, and the lower surface of the aircraft wing defines a continuous outer mold line shape.

7. The high lift system of claim 6, wherein the rigid cove-filled slat comprises:
   the front surface; and
   a rigid rear surface converging with the front surface at an upper vertex and at a lower vertex such that the upper vertex abuts the upper surface of the aircraft wing and the lower vertex is proximate to the lower surface of the aircraft wing when the rigid cove-filled slat is configured in the stowed position such that the rigid rear surface between the upper vertex and the lower vertex is hidden from an ambient airflow over the aircraft wing in the stowed position, wherein at least a portion of the rigid rear surface between the upper vertex and the lower vertex is not concave.

8. The high lift system of claim 7, wherein an ambient airflow turning angle corresponding to the lower vertex is less than approximately 90 degrees.

9. The high lift system of claim 7, wherein the lower vertex is positioned a gap width apart from the lower surface of the aircraft wing when the rigid cove-filled slat is configured in the stowed position, and wherein the rotatable panel is sized to bridge the gap width when rotated down with the rigid cove-filled slat configured in the stowed position.

10. The high lift system of claim 7, wherein the rotatable panel is hinged to the rigid cove-filled slat proximate to the lower vertex and is configured to rotate downward from the rigid rear surface when the rigid cove-filled slat is retracted to the stowed position such that the rotatable panel bridges a gap width between the lower vertex and the lower surface of the aircraft wing and a distal edge of the rotatable panel abuts the lower surface of the aircraft wing, and wherein the rotatable panel is configured to rotate upward toward the rigid rear surface when the rigid cove-filled slat is extended away from the aircraft wing.

11. The high lift system of claim 10, further comprising an actuator attached to the rotatable panel and configured to rotate the rotatable panel around the hinge proximate to the lower vertex.

12. The high lift system of claim 11, further comprising a controller operative to coordinate deployment and retraction of the rigid cove-filled slat and the rotatable panel such that deployment of the rigid cove-filled slat initiates retraction of the rotatable panel upward toward the rigid rear surface, and such that retraction of the rigid cove-filled slat initiates deployment of the rotatable panel downward away from the rigid rear surface to bridge the gap width and complete the continuous outer mold line shape.

13. A method for reducing aircraft noise associated with a high lift system, comprising:
   deploying a rigid cove-filled slat from a position proximate to a fixed leading edge of an aircraft wing to a high lift position, the rigid cove-filled slat having an upper vertex and a lower vertex, having a substantially concave area on a rear surface of the slat, and having a cove-filled substantially convex area below the concave area; and upon deployment of the rigid cove-filled slat to the high lift position, retracting a rotatable panel connected to the rigid cove-filled slat from a deployed position bridging a gap width between the lower vertex and a lower surface of the aircraft wing to a stowed position against the cove-filled convex area on the rear surface of the rigid cove-filled slat.

14. The method of claim 13, wherein retracting the rigid cove-filled slat from the high lift position to the stowed position comprises retracting the rigid cove-filled slat to a position in which a distal end of the rotatable panel abuts a lower surface of the aircraft wing such that an upper surface of the aircraft wing, a front surface of the rigid cove-filled slat, the rotatable panel, and the lower surface of the aircraft wing forms a continuous outer mold line shape.

15. The method of claim 13, further comprising:
receiving a request to deploy the rigid cove-filled slat;
in response to receiving the request to deploy the rigid cove-filled slat, activating a rotary actuator and pinion gear within the aircraft wing to extend a slat track attached to the rigid cove-filled slat and configured to extend and guide the rigid cove-filled slat to the high lift position; and
further in response to receiving the request to deploy the rigid cove-filled slat, activating an actuator within the rigid cove-filled slat to retract the rotatable panel connected to the rigid cove-filled slat from the deployed position to the stowed position against the rear surface of the rigid cove-filled slat.

16. The method of claim 15, further comprising:
receiving a request to retract the rigid cove-filled slat;
in response to receiving the request to retract the rigid cove-filled slat, activating the rotary actuator and pinion gear within the aircraft wing to retract the slat track attached to the rigid cove-filled slat; and
further in response to receiving the request to retract the rigid cove-filled slat, activating the actuator within the rigid cove-filled slat to deploy the rotatable panel connected to the rigid cove-filled slat from the stowed position against the rear surface of the rigid cove-filled slat to the deployed position in which the rotatable panel extends outward from the rear surface.

17. The method of claim 16, wherein activating the rotary actuator within the rigid cove-filled slat comprises activating the actuator until the rotatable panel aligns with and abuts a lower surface of the aircraft wing such that an upper surface of the aircraft wing, a front surface of the rigid cove-filled slat, the rotatable panel, and the lower surface of the aircraft wing forms a continuous outer mold line shape.

\* \* \* \* \*